US012696168B2

(12) United States Patent
Esswie

(10) Patent No.: US 12,696,168 B2
(45) Date of Patent: Jul. 28, 2026

(54) TERRESTRIAL-ASSISTED NON-TERRESTRIAL UPLINK PATH SWITCH

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 18/493,711

(22) Filed: Oct. 24, 2023

(65) Prior Publication Data

US 2025/0133473 A1     Apr. 24, 2025

(51) Int. Cl.
*H04W 40/12*         (2009.01)
*H04B 7/185*         (2006.01)
*H04W 56/00*         (2009.01)

(52) U.S. Cl.
CPC ........ *H04W 40/12* (2013.01); *H04B 7/18513* (2013.01); *H04W 56/0045* (2013.01)

(58) Field of Classification Search
CPC ............. H04W 40/12; H04W 56/0045; H04W 56/005; H04W 56/0015; H04W 84/06; H04B 7/18513; H04B 7/18541; H04B 7/18563; H04B 7/185
See application file for complete search history.

(56) References Cited

U.S. PATENT DOCUMENTS

2020/0162985 A1*  5/2020  Roy ...................... H04W 36/22
2021/0175964 A1   6/2021  Kusashima et al.

2021/0320712 A1*  10/2021  Goettle .............. H04B 7/18506
2023/0070647 A1   3/2023  Matsuda et al.
2023/0232289 A1   7/2023  Zhao
2023/0296720 A1*  9/2023  Manolakis ......... H04B 7/18563
                                                      455/456.1
2024/0022972 A1*  1/2024  Yavuz ............... H04W 36/0061
2024/0146394 A1*  5/2024  Vivanco ................ H04W 48/16

(Continued)

OTHER PUBLICATIONS

Shiyang Leng: U.S. Appl. No. 63/530,601, UE-Based Timing Advance Measurement in Wireless Systems (Year: 2023).*

(Continued)

*Primary Examiner* — Mohamed A Kamara

(74) *Attorney, Agent, or Firm* — Amin, Turocy & Watson, LLP

(57)                    ABSTRACT

A zone timing advance value corresponding to a zone associated with a non-terrestrial network node may be determined. A terrestrial network node facilitating delivery of traffic with respect to a user equipment may determine to offload a portion of the traffic for delivery via the non-terrestrial network node. The terrestrial node may request the zone timing advance value, from a core network or from the non-terrestrial node, and may transmit a path switch request message comprising the zone timing advance value to the user equipment. The path switch request message may indicate traffic flows for which traffic is to be offloaded to the non-terrestrial node and may comprise indication of uplink resources corresponding to the non-terrestrial node to be usable by the user equipment to transmit the offloaded uplink traffic to the non-terrestrial node.

20 Claims, 13 Drawing Sheets

400

(56) References Cited

U.S. PATENT DOCUMENTS

2025/0048200 A1* 2/2025 Leng ................. H04W 36/0072

OTHER PUBLICATIONS

International Search Report and Written Opinion mailed Aug. 12, 2024 for PCT Application No. PCT/US2024/013873, 15 pages.
Notification Concerning Transmittal of International Preliminary Report on Patentability mailed May 7, 2026 for PCT Application No. PCT/US2024/013873, 10 pages.
European Office Action mailed Jun. 2, 2026 for European Patent Application No. 24711302.0, 3 pages.

* cited by examiner

200

300

400

500

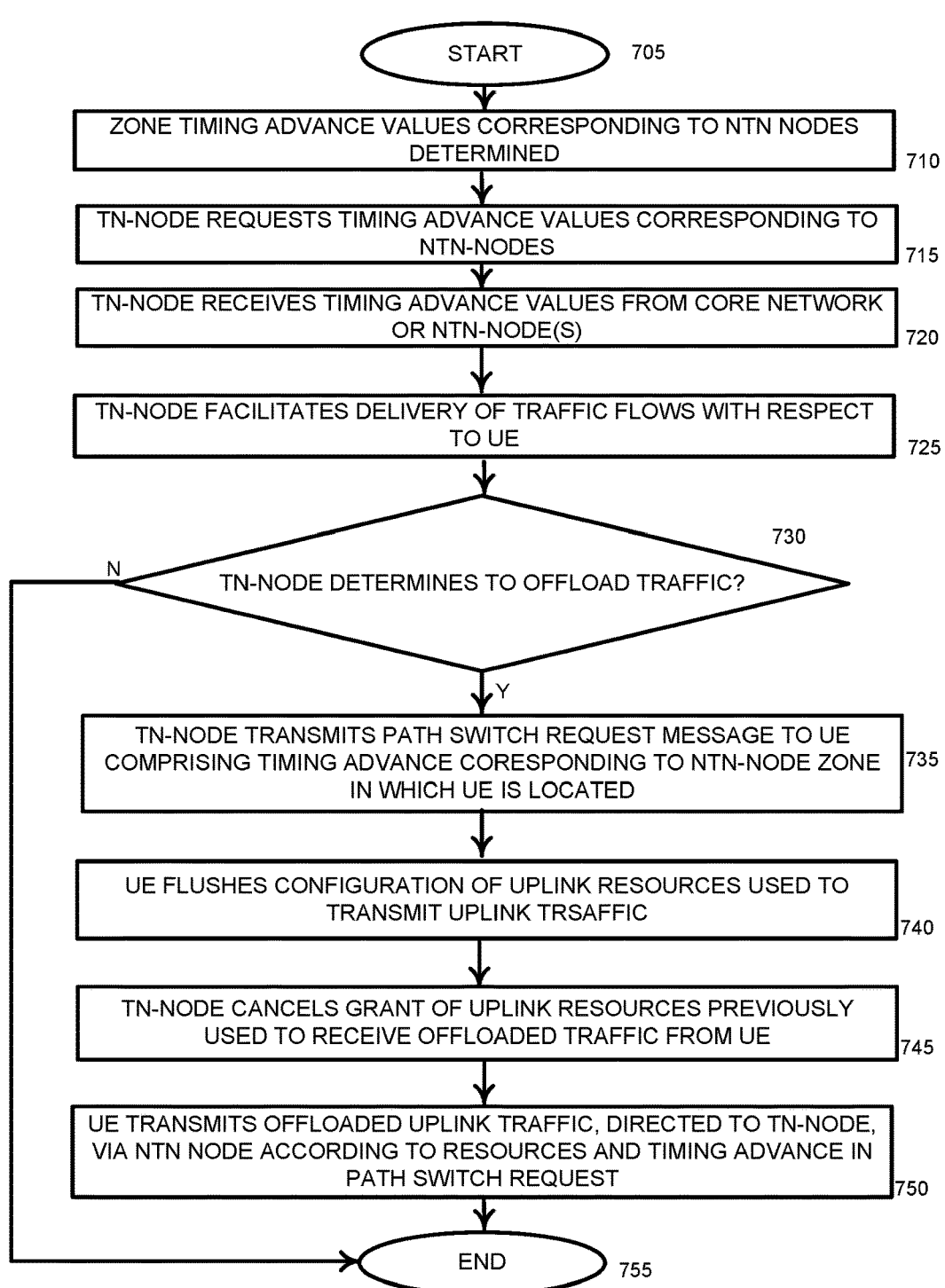

START — 705

ZONE TIMING ADVANCE VALUES CORRESPONDING TO NTN NODES DETERMINED — 710

TN-NODE REQUESTS TIMING ADVANCE VALUES CORRESPONDING TO NTN-NODES — 715

TN-NODE RECEIVES TIMING ADVANCE VALUES FROM CORE NETWORK OR NTN-NODE(S) — 720

TN-NODE FACILITATES DELIVERY OF TRAFFIC FLOWS WITH RESPECT TO UE — 725

TN-NODE DETERMINES TO OFFLOAD TRAFFIC? — 730

N

Y

TN-NODE TRANSMITS PATH SWITCH REQUEST MESSAGE TO UE COMPRISING TIMING ADVANCE CORESPONDING TO NTN-NODE ZONE IN WHICH UE IS LOCATED — 735

UE FLUSHES CONFIGURATION OF UPLINK RESOURCES USED TO TRANSMIT UPLINK TRSAFFIC — 740

TN-NODE CANCELS GRANT OF UPLINK RESOURCES PREVIOUSLY USED TO RECEIVE OFFLOADED TRAFFIC FROM UE — 745

UE TRANSMITS OFFLOADED UPLINK TRAFFIC, DIRECTED TO TN-NODE, VIA NTN NODE ACCORDING TO RESOURCES AND TIMING ADVANCE IN PATH SWITCH REQUEST — 750

END — 755

Figure 8:
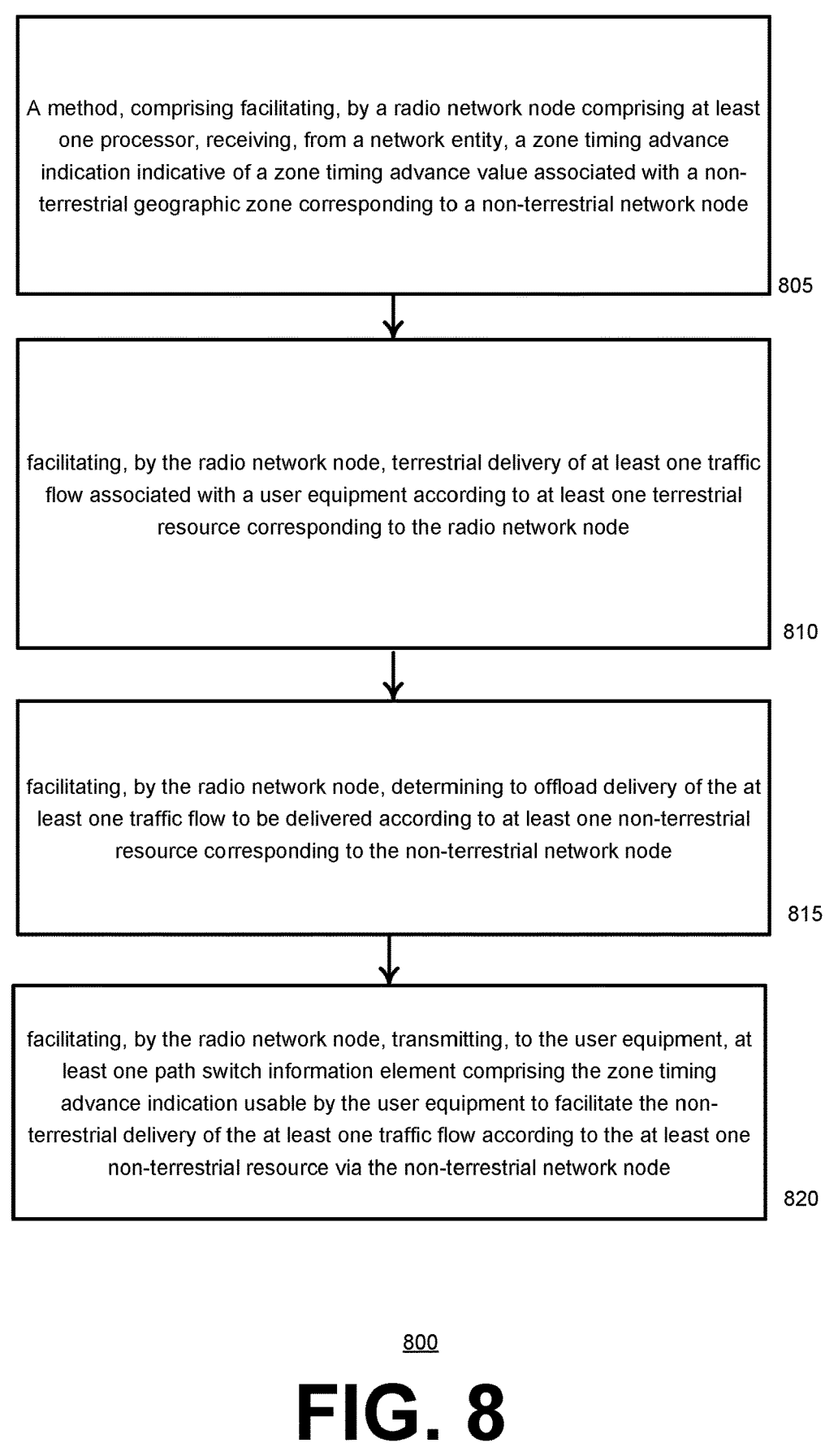

A method, comprising facilitating, by a radio network node comprising at least one processor, receiving, from a network entity, a zone timing advance indication indicative of a zone timing advance value associated with a non-terrestrial geographic zone corresponding to a non-terrestrial network node

805 facilitating, by the radio network node, terrestrial delivery of at least one traffic flow associated with a user equipment according to at least one terrestrial resource corresponding to the radio network node

810 facilitating, by the radio network node, determining to offload delivery of the at least one traffic flow to be delivered according to at least one non-terrestrial resource corresponding to the non-terrestrial network node

815 facilitating, by the radio network node, transmitting, to the user equipment, at least one path switch information element comprising the zone timing advance indication usable by the user equipment to facilitate the non-terrestrial delivery of the at least one traffic flow according to the at least one non-terrestrial resource via the non-terrestrial network node

Figure 9:
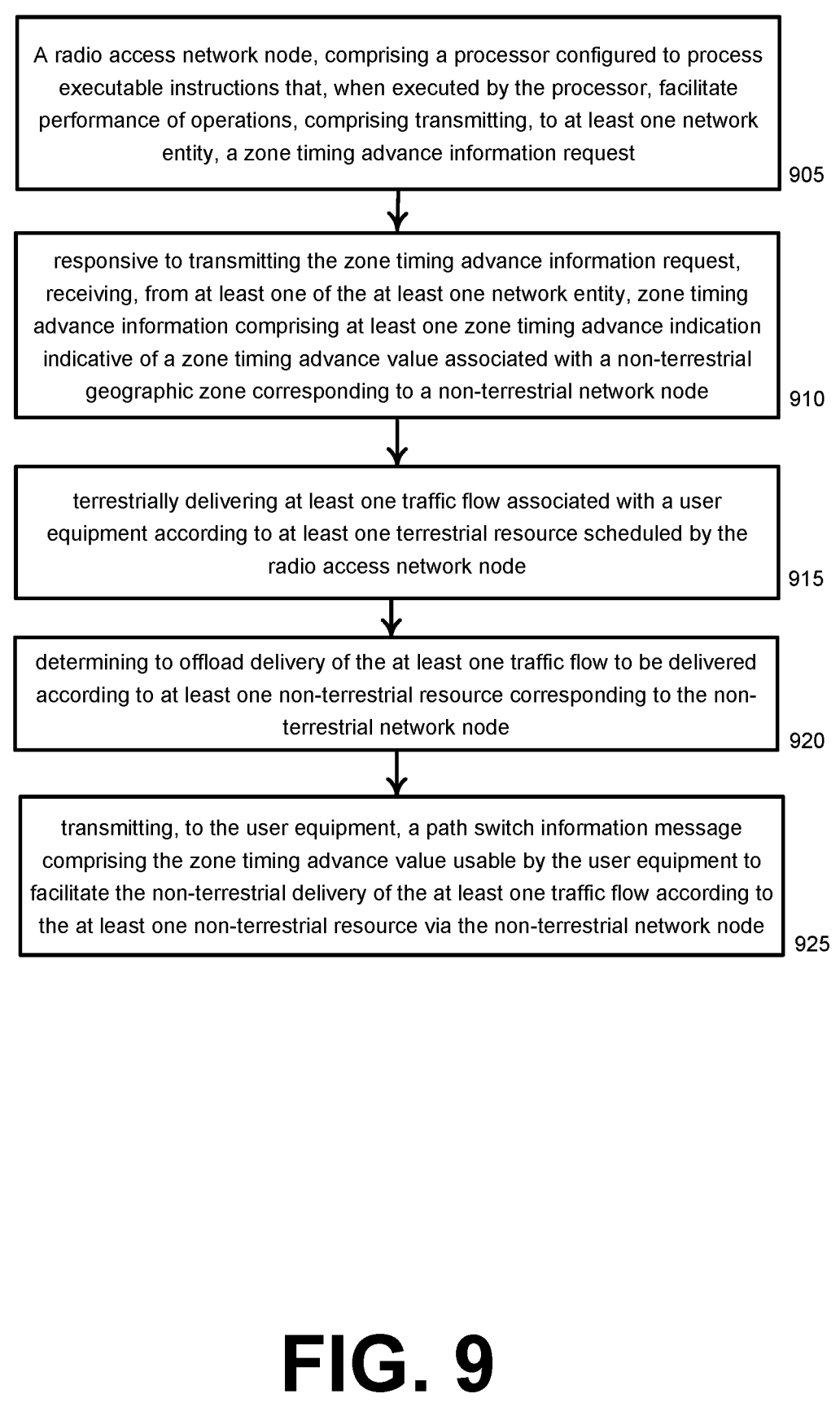

A radio access network node, comprising a processor configured to process executable instructions that, when executed by the processor, facilitate performance of operations, comprising transmitting, to at least one network entity, a zone timing advance information request

905 responsive to transmitting the zone timing advance information request, receiving, from at least one of the at least one network entity, zone timing advance information comprising at least one zone timing advance indication indicative of a zone timing advance value associated with a non-terrestrial geographic zone corresponding to a non-terrestrial network node

910 terrestrially delivering at least one traffic flow associated with a user equipment according to at least one terrestrial resource scheduled by the radio access network node

915 determining to offload delivery of the at least one traffic flow to be delivered according to at least one non-terrestrial resource corresponding to the non-terrestrial network node

920 transmitting, to the user equipment, a path switch information message comprising the zone timing advance value usable by the user equipment to facilitate the non-terrestrial delivery of the at least one traffic flow according to the at least one non-terrestrial resource via the non-terrestrial network node

Figure 10:
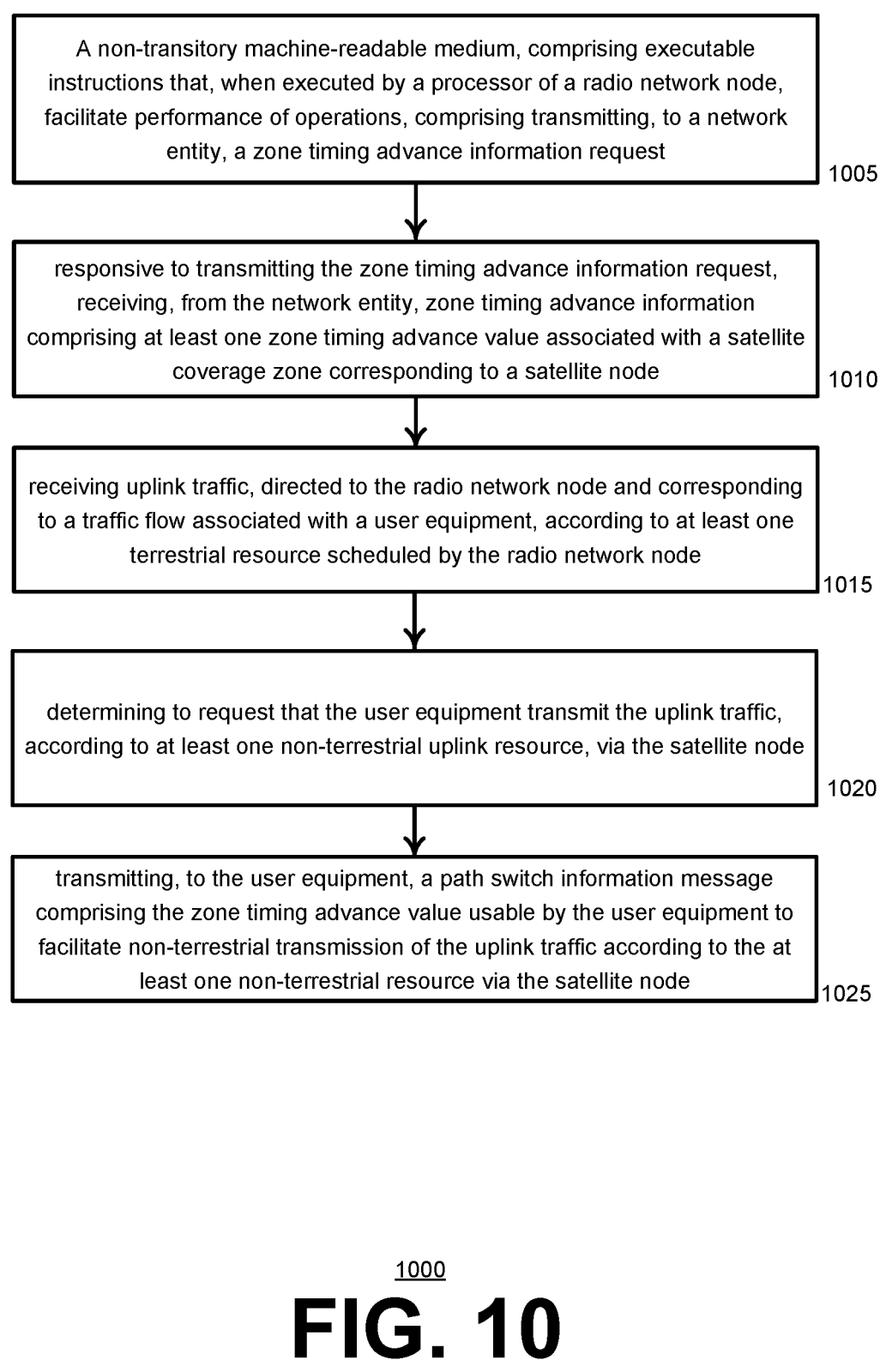

A non-transitory machine-readable medium, comprising executable instructions that, when executed by a processor of a radio network node, facilitate performance of operations, comprising transmitting, to a network entity, a zone timing advance information request

1005 responsive to transmitting the zone timing advance information request, receiving, from the network entity, zone timing advance information comprising at least one zone timing advance value associated with a satellite coverage zone corresponding to a satellite node

1010 receiving uplink traffic, directed to the radio network node and corresponding to a traffic flow associated with a user equipment, according to at least one terrestrial resource scheduled by the radio network node

1015 determining to request that the user equipment transmit the uplink traffic, according to at least one non-terrestrial uplink resource, via the satellite node

1020 transmitting, to the user equipment, a path switch information message comprising the zone timing advance value usable by the user equipment to facilitate non-terrestrial transmission of the uplink traffic according to the at least one non-terrestrial resource via the satellite node

TERRESTRIAL-ASSISTED
NON-TERRESTRIAL UPLINK PATH SWITCH

BACKGROUND

The 'New Radio' (NR) terminology that is associated with fifth generation mobile wireless communication systems ("5G") refers to technical aspects used in wireless radio access networks ("RAN") that comprise several quality-of-service classes ("QoS"), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption at the RAN node or at a non-terrestrial radio node.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio network node comprising at least one processor, receiving, from a network entity, a zone timing advance indication indicative of a zone timing advance value associated with a non-terrestrial geographic zone corresponding to a non-terrestrial network node. The method may comprise facilitating, by the radio network node, terrestrial delivery of at least one traffic flow associated with a user equipment according to at least one terrestrial resource corresponding to the radio network node. The method may further comprise facilitating, by the radio network node, determining to offload delivery of the at least one traffic flow to be delivered according to at least one non-terrestrial resource corresponding to the non-terrestrial network node. The method may further comprise facilitating, by the radio network node, transmitting, to the user equipment, at least one path switch information element comprising the zone timing advance indication usable by the user equipment to facilitate the non-terrestrial delivery of the at least one traffic flow according to the at least one non-terrestrial resource via the non-terrestrial network node.

In an embodiment, the at least one traffic flow may correspond to at least one QoS criterion. The method may further comprise determining, by the radio network node, that the at least one non-terrestrial resource corresponds to satisfaction of the at least one QoS criterion. The determining to offload the delivery of the at least one traffic flow may be based on the at least one non-terrestrial resource being determined to correspond to the satisfaction of the at least one QoS criterion.

In an embodiment, a terrestrial coverage region corresponding to the radio network node may overlap, geographically, with the non-terrestrial geographic zone. In an embodiment, the at least one path switch information element may further comprise at least one non-terrestrial resource indication indicative of the at least one non-terrestrial resource. In an embodiment, the at least one path switch information element may further comprise a non-terrestrial network node identifier corresponding to the non-terrestrial network node.

In an embodiment, the network entity may be part of a core network. In an embodiment, the network entity may comprise the non-terrestrial network node. In an embodiment, the non-terrestrial network node may comprise a satellite.

In an embodiment, the method may further comprise obtaining, by the radio network node, the zone timing advance value, the zone timing advance value having been determined to exclude transporting a signal between the user equipment and the non-terrestrial network node.

In an embodiment, the user equipment may be a first user equipment. The method may further comprise obtaining, by the radio network node, the zone timing advance value, the zone timing advance value having been determined based on at least one measured value corresponding to a second user equipment.

In an embodiment, the user equipment may be a first user equipment. The method may further comprise obtaining, by the radio network node, the zone timing advance value, the zone timing advance value having been determined based on application of a defined function to measured timing advance values that correspond to user equipment other than the first user equipment.

A zone perimeter may define the non-terrestrial geographic zone. The zone perimeter may comprise a first location and a second location. The first location and the second location may be separated by a maximum separation distance corresponding to the zone perimeter. A first timing advance corresponding to the first location and a second timing advance corresponding to the second location may deviate by less than, or the same as a minimum scheduling time unit.

In another example embodiment, a radio access network node may comprise a processor configured to process executable instructions that, when executed by the processor, facilitate performance of operations, comprising transmitting, to at least one network entity, a zone timing advance information request and responsive to transmitting the zone timing advance information request, receiving, from at least one of the at least one network entity, zone timing advance information comprising at least one zone timing advance indication indicative of a zone timing advance value associated with a non-terrestrial geographic zone corresponding to a non-terrestrial network node. The operations may comprise terrestrially delivering at least one traffic flow associated with a user equipment according to at least one terrestrial resource scheduled by the radio access network node. The operations may further comprise determining to offload delivery of the at least one traffic flow to be delivered according to at least one non-terrestrial resource corresponding to the non-terrestrial network node and transmitting, to the user equipment, a path switch information message comprising the zone timing advance value usable by the user equipment to facilitate the non-terrestrial delivery of the at least one traffic flow according to the at least one non-terrestrial resource via the non-terrestrial network node.

In an embodiment, the zone timing advance information request may comprise a zone identifier corresponding to the non-terrestrial geographic zone. The at least one network entity may determine the zone timing advance value corresponding to the non-terrestrial geographic zone associated with the zone identifier.

In an embodiment, the at least one non-terrestrial resource may be scheduled by the radio access network node. The at least one non-terrestrial resource may be usable to transmit, to the non-terrestrial network node, uplink traffic corresponding to the at least one traffic flow.

In yet another example embodiment, a non-transitory machine-readable medium may comprise executable instructions that, when executed by a processor of a radio network node, facilitate performance of operations, comprising transmitting, to a network entity, a zone timing advance information request and responsive to transmitting the zone timing advance information request, receiving, from the network entity, zone timing advance information comprising at least one zone timing advance value associated with a satellite coverage zone corresponding to a satellite node. The operations may comprise receiving uplink traffic, directed to the radio network node and corresponding to a traffic flow associated with a user equipment, according to at least one terrestrial resource scheduled by the radio network node. The operations may further comprise determining to request that the user equipment transmit the uplink traffic, according to at least one non-terrestrial uplink resource, via the satellite node and transmitting, to the user equipment, a path switch information message comprising the zone timing advance value usable by the user equipment to facilitate non-terrestrial transmission of the uplink traffic according to the at least one non-terrestrial resource via the satellite node.

In an embodiment, the satellite node may exclude, or may not include, a non-terrestrial node gateway.

In an embodiment, the operations may further comprise scheduling the at least one non-terrestrial resource. The path switch information message may comprise at least one non-terrestrial uplink resource indication indicative of the at least one non-terrestrial uplink resource usable by the user equipment transmit the uplink traffic, directed to the radio network node, via the satellite node. The path switch information message may comprise a satellite node identifier indicative of the satellite node.

In an embodiment, the uplink traffic may correspond to at least one QoS criterion. The operations may further comprise determining that a congestion value corresponds to the at least one terrestrial resource violating a congestion criterion to result in a determined congestion value and responsive to the determined congestion value being determined to correspond to the violating of the congestion criterion, determining that the at least one non-terrestrial resource corresponds to satisfaction of the at least one QoS criterion. The radio network node may determine to request that the user equipment transmit the uplink traffic, according to at least one non-terrestrial uplink resource, via the satellite node, based on the at least one non-terrestrial resource being determined to correspond to the satisfaction of the at least one QoS criterion.

BRIEF DESCRIPTION OF THE DRAWINGS

FIG. 7 illustrates a flow diagram of an example embodiment method.

FIG. 8 illustrates a block diagram of an example method embodiment.

FIG. 9 illustrates a block diagram of an example radio access network node.

FIG. 10 illustrates a block diagram of an example non-transitory machine-readable medium embodiment.

DETAILED DESCRIPTION OF THE DRAWINGS

Figure 1:
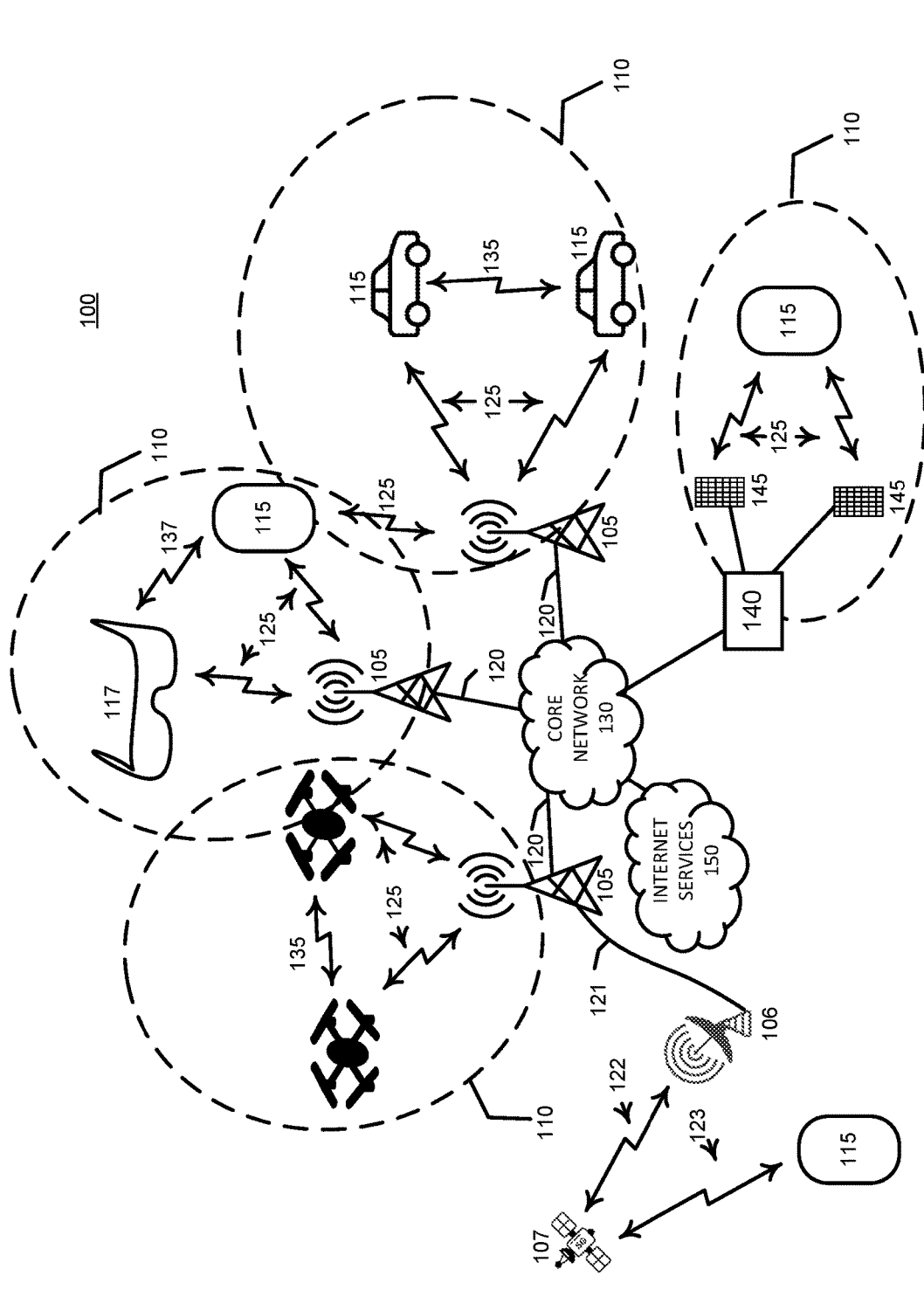
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, an end extended reality appliance, an extended reality processing unit, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as 5G Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and underserved regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. such applications may benefit not only traditional voice and data services but also for technologies, such as, for example, Internet of Things ("IoT"), wherein connectivity is typically a desirable, or a fundamental requirement.

A non-terrestrial base station 106, which may comprise a satellite antenna, may be coupled to core network 130. Non-terrestrial base station 106 may communicate with satellite 107, which may communicate with a user equipment 115. Satellite 107 and non-terrestrial base station 106, which may be referred to as a gateway, may be part of a non-terrestrial network ("NTN") that may facilitate delivering traffic corresponding to a radio access network, which may comprise RAN nodes 105. RAN nodes 105 may be in communication with core network 130 and other RAN nodes via backhaul links 120, and via long-range wireless links 125 to user equipment that may be located beyond satisfactory coverage range of a RAN node 105. Links 121 between RAN nodes 105 and satellite base station/gateway 106 may comprise coaxial, fiber, or wireless links that may be similar to links 120. Links 122 to satellite node 107 and links 123 from satellite/node 107 to UE 115 may comprise line-of-sight microwave signal transmission. A UE 115 may be configured with at least one antenna, or at least one processor, to facilitate transmitting or receiving microwave signals to/from satellite node 107, and if so configured may be referred to as an NTN-capable user equipment device. Description herein of a radio node or a radio network node may be a reference to either a RAN node 105 or a node that comprises a satellite node 107. Reference to a satellite node, or a non-terrestrial network node, may comprise a reference to satellite 107, base station gateway 106, or a combination of satellite 107 and base station/gateway 106.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node, or to a satellite node, which may comprise a gateway 106 or a satellite 107.

Although use of NTNs can result in expanding coverage that may be available with ground-based RANs or complementing coverage corresponding to a ground-based RAN by overlapping terrestrial network ("TN") and NTN coverages, thus making NTNs potentially cost efficient in remote rural areas, mountainous areas, and in general where ground cellular deployments are either not possible or not cost efficient.

Use of NTNs can enhance, extend, or expand, coverage of ground RANs, making NTNs cost efficient in remote rural areas, mountainous areas, and generally where ground cellular deployments are either not possible or not cost efficient. However, problems resulting from integration of NTNs with ground cellular networks may arise that are not significant problems with ground-only radio access networks. For example, satellite/NTN spectrum resources are more abundant, or plentiful, than conventional cellular spectrum (e.g., sub-6 GHz spectrum). Thus, NTN/satellite spectrum can potentially boost ground cellular capacity, especially for capacity-intensive, but latency-tolerant, cellular traffic and applications. However, conventional techniques do not facilitate efficient coordination of traffic scheduling that may cross from a TN-RAN node to an NTN node, and vice versa (e.g., traffic that is offloaded from being delivered via a TN-RAN node to being delivered via an NTN node).

For downlink traffic offloading, an NTN-capable user equipment device can immediately receive traffic that has been offloaded from a TN node to an NTN node, since user equipment that may have indicated, to the TN node, capability to receive traffic from an NTN node may retain downlink synchronization that may have been performed based on receiving a discovery signal broadcast by the TN node. However, for uplink traffic offloading, an NTN-capable user equipment device must first determine an uplink timing advance, measured at the NTN/satellite of interest, which may consume an amount of time equivalent to at least a full round trip delay with respect to the NTN/satellite (e.g., time for transmitting an uplink NTN preamble and receiving a timing advance measurement report from the NTN responsive to the preamble), which may be hundreds of milliseconds due to the large NTN propagation delay between a user equipment 115 and a satellite 107 via links 123 as shown in FIG. 1. Such a lengthy delay may result in an NTN-capable user equipment being unable to transmit offloaded uplink traffic flows immediately after receiving traffic offloading path switching configuration information from a serving TN-RAN node. After receiving a message from a TN-RAN comprising path switching information indicating to a user equipment that uplink traffic is to be offloaded from the TN-RAN node to an NTN-node, a significant amount of time is consumed in determining an NTN-specific timing advance before the user equipment can begin transmitting offloaded uplink traffic towards the NTN node.

According to embodiments disclosed herein, NTN-capable user equipment devices may obtain a prospectively-determined NTN uplink timing advance value simultaneously with receiving traffic offloading information and accordingly may avoid significant uplink traffic transmission delay. The prospectively-determined timing advance value may facilitate a user equipment transmitting uplink traffic, to an NTN node instead of the TN-RAN node, based on the timing advance value determined before the user equipment is instructed to transmit offloaded traffic directed to the TN-RAN node because of the significant vertical distance between a user equipment at the surface of the Earth and a satellite NTN node and because of the fixed speed of an NTN/satellite relative to the user equipment, at least in the case where the NTN node comprises a GEO satellite. Due to the long distance and the fixed location of the satellite relative to the user equipment, a timing advance corresponding to the user equipment with respect to the NTN node will tend to be the same within a given geographic region on the Earth's surface, within a standard deviation. Put another way, a similar NTN timing advance value may be applicable to NTN-capable devices within a geographical region on the Earth's surface with respect to the same NTN/satellite. Therefore, a timing advance value corresponding to an NTN satellite/node can be prospectively estimated and reported to NTN-capable user equipment located in a geographic region, or zone, corresponding to the timing advance value. The prospectively-determined timing advance value may be determined based on previous attempts by one or more user equipment to access an NTN node. Accordingly, a prospectively-determined timing advance value may facilitate fast uplink path switching wherein uplink traffic directed to a TN node that is buffered, or pending, at a user equipment can be offloaded and transmitted to an NTN node using the prospectively-determined timing advance value without further delay to determine a timing advance value, and thus the pending traffic may be transmitted using non-terrestrial node spectrum resources (e.g., resources corresponding to link 123 shown in FIG. 1) instead of continuing to use potentially congested terrestrial interface resources (e.g., resources corresponding to link 125 shown in FIG. 1).

Terrestrial-Assisted Non-Terrestrial Uplink Path Switch.

For uplink traffic offloading, an NTN-capable user equipment device needs to obtain uplink synchronization with the NTN/satellite to which uplink traffic will be offloaded. Upon receiving NTN uplink traffic offloading configuration information from a serving TN-RAN node, NTN-capable user equipment transmits an uplink preamble towards the indicated NTN node and may responsively receive an NTN timing advance report. This conventional process of obtaining a timing advance value typically consumes hundreds of milliseconds before transmission of uplink traffic buffered at a user equipment to an NTN node can begin due to the large NTN propagation delays. According to conventional techniques for timing advance acquisition, a source TN RAN node determines its own measured timing advance, from an uplink-transmitting user equipment, and reports the determined timing advance back to the user equipment. According to embodiments disclosed herein, a TN RAN node may determine and broadcast an NTN timing advance value that may be measured by an NTN node corresponding to the timing advance value. Thus, a TN-RAN node broadcasts a timing advance value corresponding to another node. In a scenario wherein an NTN node comprises a satellite NTN node, a timing advance corresponding to an NTN node prospectively-broadcast by a TN node can be used by a user equipment, within signal range of the TN node and also within a coverage zone of the NTN node, to facilitate the user equipment transmitting uplink traffic because of the semi-static nature of the NTN timing advance with respect to the coverage zone corresponding to the NTN node. Furthermore, a timing advance corresponding to an NTN node's coverage zone may not change significantly with respect to, for example, two adjacent ground RAN nodes having coverage regions that are within, or that overlap, the NTN node's coverage zone.

Accordingly, embodiments disclosed herein may facilitate a TN node configuring a user equipment with a timing advance value that is specific to a zone corresponding to an NTN node, which zone may comprise, cover, overlap, or encompass coverage areas of multiple different ground-based TN-RAN nodes. Unlike with conventional techniques, wherein a user equipment device uses a timing advance value that is measured by a RAN node based on transmission of uplink preambles corresponding to the RAN node, according to embodiments disclosed herein an NTN-capable user equipment device may be configured by a TN-RAN node to use a timing advance that corresponds to a coverage area, or zone, associated with an NTN node, within which zone the user equipment is located, without actual device-specific timing advance measurements being performed (e.g., without the NTN node performing a measurement of time corresponding to the user equipment transmitting a preamble to the NTN node). According to embodiments disclosed herein, a path switching message may be transmitted to a user equipment that comprises a prospectively-determined NTN timing advance value and indication of one or more resources usable by the user equipment to transmit uplink traffic to an NTN node.

Figure 2:
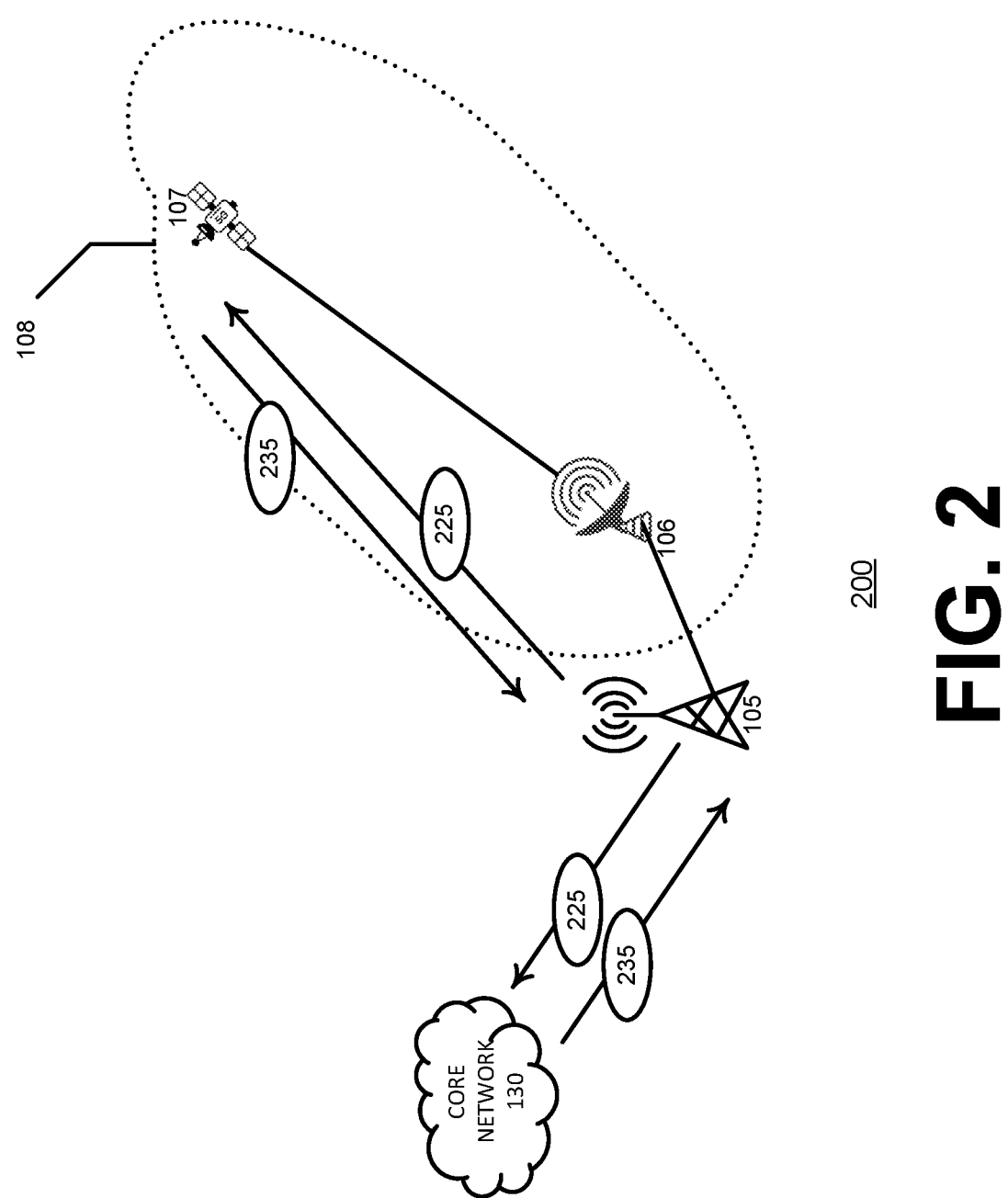
FIG. 2 illustrates an environment with a terrestrial radio network node in communication with a satellite node and a core network.

Turning now to FIG. 2, the figure illustrates environment 200 with ground-based RAN node 105, base station 106, and NTN node 107, any one or more of which may be referred to as a radio network node. For purposes of description, radio network node 108 may comprise one or more of RAN node 105, gateway 106, or satellite 107. RAN node 105 is shown communicatively coupled with core network 130, or a component thereof.

Figure 13:
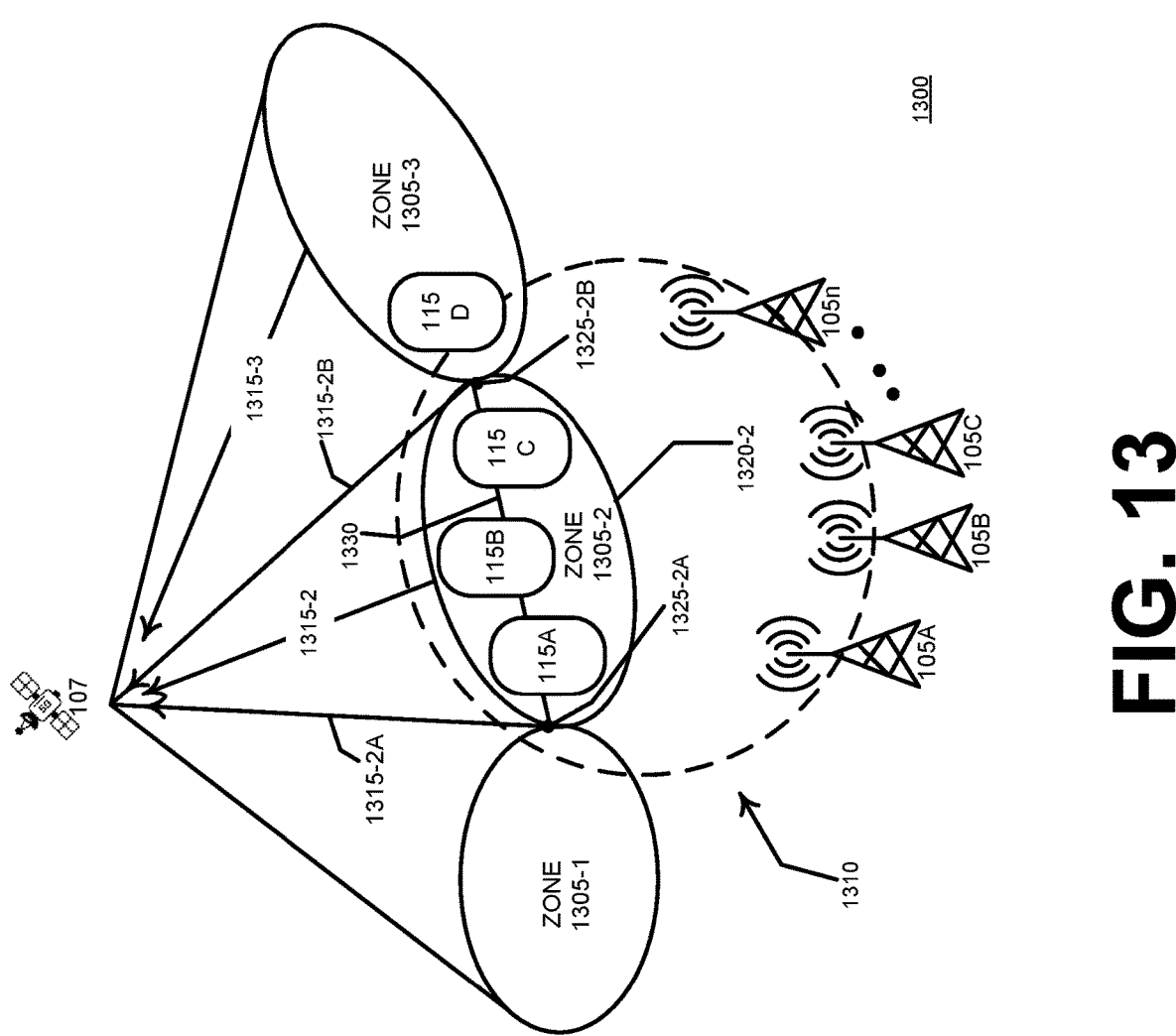
FIG. 13 illustrates an environment with multiple coverage zones corresponding to a satellite.

TN-RAN node 105 may transmit an NTN timing advance acquisition request 225, which may be referred to as a zone timing advance information request, toward core network entities 130 via backhaul links, or directly toward NTN/satellite node 107 via NTN gateway 106. Zone timing advance information request 225 may comprise one or more zone identifiers corresponding to one or more NTN zones with which TN-RAN node 105 may be associated. A zone identifier may correspond to a geographical region, or zone, with which a group of TN-RAN nodes is associated. (E.g., as shown in FIG. 13, RAN nodes 105A-105$n$ may have coverage areas that overlap with zone 1305-2, and thus may be deemed as being associated with zone 1305-2). Including a zone identifier in a request 225 may facilitate a core network entity, or NTN node 107, determining an appropriate timing advance value to return to TN-RAN node 105 that is related to an NTN zone that overlaps with locations of NTN-capable devices with respect to which uplink traffic may be offloaded to the NTN node.

Upon receiving zone timing advance information request 225, NTN/satellite node 107, and/or an entity of core network 130, may determine a timing advance corresponding to a zone identified in the request. An entity of core network 130, or node 107, may respond to request 225 with zone timing advance information 235. Zone timing advance information 235 may comprise at least one zone timing advance indication indicative of a zone timing advance value associated with a non-terrestrial geographic zone corresponding to non-terrestrial network node 107. In an embodiment, if no zone identifier is included in request 225, NTN node 107, or the core network entity, may respond to request 225 with zone timing advance information 235 that may comprise all measured/determined timing advance values respectively corresponding to all zones corresponding to an NTN node. For example, a measured NTN timing advance value for each of multiple zones corresponding to node 107 may be calculated by averaging and/or specially filtering all measured/detected NTN uplink timing advances previously received from NTN-capable user equipment while located in a zone during a timing advance measurement period.

Figure 3:
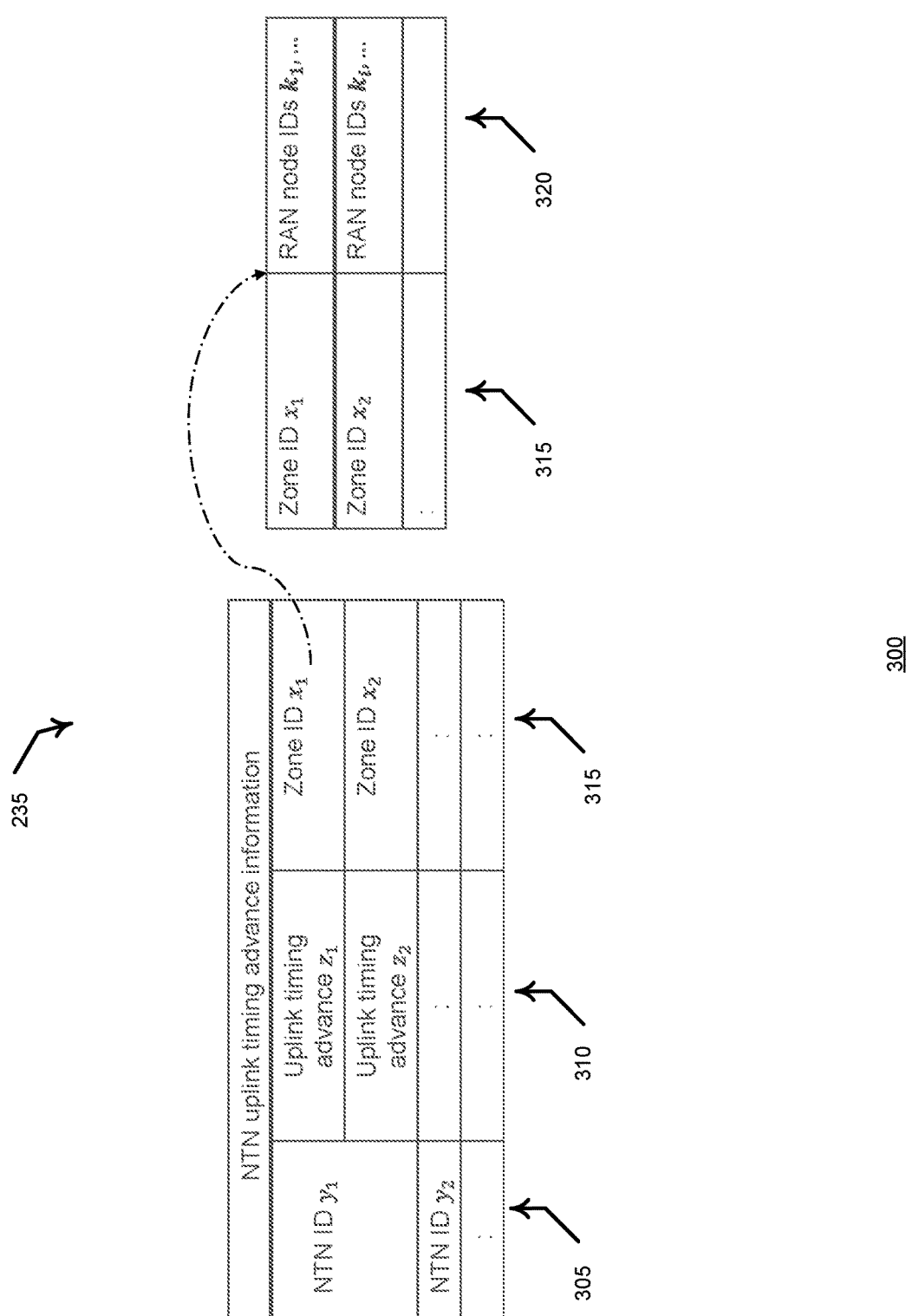
FIG. 3 illustrates non-terrestrial uplink timing advance information.

Responsive to request 225, TN-RAN node 105 may receive zone timing advance information 235, including timing advance values 310 corresponding to one or more zones identified by one or more zone identifiers 315, that are associated with an NTN node identifier 305 shown in FIG. 3 (e.g., a node identifier 305 corresponds to an NTN node, such as, for example, node 107 shown in FIG. 2). Zone timing advance information 235 may also comprise one or more TN-RAN node identifiers 320 associated with a zone identifier 315.

Figure 4:
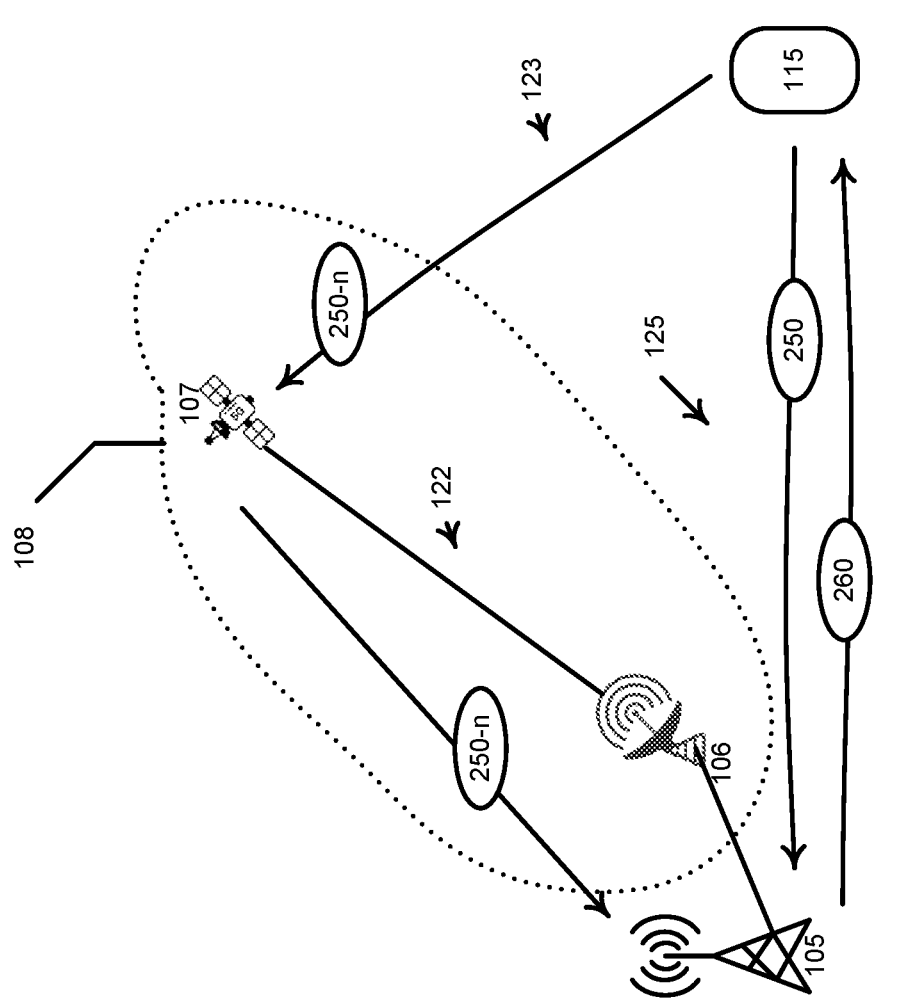
FIG. 4 illustrates switching of transmission of uplink traffic to a terrestrial node to transmission to a non-terrestrial node.

On condition of TN-RAN node 105 determining that uplink resource utilization of link 125 shown in FIG. 4 exceed a utilization criterion, such as a maximum utilization threshold, the TN-RAN node may initiate offloading of uplink traffic flow 250, and/or uplink bearers corresponding thereto, which may correspond to a QoS requirement that can be satisfied by being offloaded for delivery via satellite node 107. Accordingly, TN-RAN node may transmit an NTN uplink path switching request 260, which may be referred to as a path switch information message, towards NTN-capable user equipment device 115. Path switch information message 260 may comprise a zone timing advance value usable by user equipment 115 to facilitate non-terrestrial delivery of at least one traffic flow 250 via non-terrestrial network node 107 according to at least one non-terrestrial resource indicated in the path switch information message. As shown in FIG. 4, traffic corresponding to traffic flow 250, that was being delivered directly by RAN node 105, is offloaded for delivery via satellite node 107 and is shown as flow 250-$n$ being delivered from UE 115 to satellite node 107 and from satellite node 107 to TN-RAN node 105. (The "-n" suffix is added to the traffic flow reference number in FIG. 4 to indicate that a portion of traffic 250, but not necessarily all of traffic 250, may be offloaded for delivery via satellite node 107.)

Figure 5:
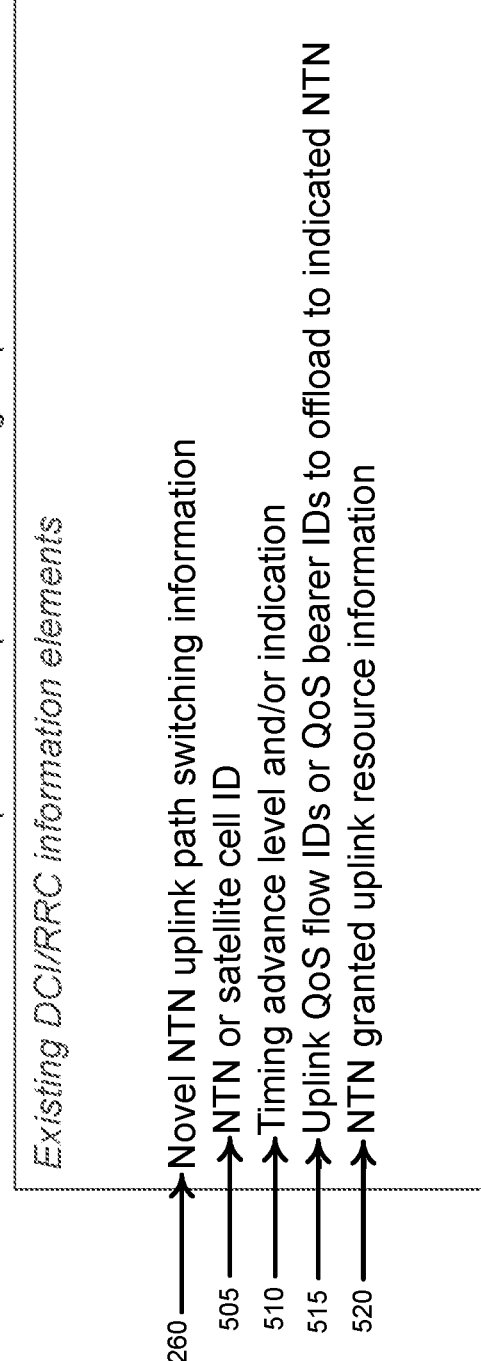
FIG. 5 illustrates an example uplink path switching request.

As shown in FIG. 5, information contained in path switch information message 260 may comprise an NTN node identifier 505 indicating a target NTN node (e.g., an NTN node targeted for offloading). Path switch information message 260 may comprise a determined NTN timing advance value 510 that corresponds to an NTN zone that may overlap a coverage region corresponding to a TN-RAN node that is currently facilitating delivery of a traffic flow with respect to a user equipment to which information 260 is transmitted. Path switch information message 260 may comprise indication(s) 520 of scheduled NTN uplink resources usable by a user equipment, to which information 260 is transmitted, to transmit offloaded traffic to an NTN node indicated by NTN identifier 505. Path switch information message 260 may comprise one or more indication(s) 515 of uplink traffic flows, or uplink traffic flow bearers, to be offloaded for delivery via an NTN node identified by identifier 505. As shown in FIG. 4, responsive to receiving path switch information message 260, NTN-capable user equipment device 115 may re-routes traffic 250-$n$, which may have been indicated in field 315 shown in FIG. 5, via target NTN node 107, which may have been identified in field 505 shown in FIG. 5, instead of via currently-serving TN-RAN node 105, which may receive the offloaded uplink traffic, relayed by respective NTN node 107, via links 122 between NTN gateway 106 and node 107.

FIG. 5 illustrates an example uplink path switching request information 260. Uplink path switching request information 260 may be included in a downlink control information message 500. Request information 260 may comprise: a target NTN identifier 505, indicative of an NTN node to which one or more uplink traffic flows are to be offloaded. Request information 260 may comprise a determined NTN-specific uplink timing advance 510 corresponding to an NTN node indicated in identifier field 505. Request 260 may comprise an uplink QoS flow identifier or an uplink bearer identifier in field 515, indicative of one or more traffic flows to be offloaded from a currently serving TN interface to an associated NTN node indicated in respective field 505. Request 260 may comprise uplink NTN granted resource information or transmission configuration in field 520, corresponding to resources or transmission configurations usable by a user equipment to facilitate offloading of traffic indicated in field 515 from a serving TN RAN node to an NTN node indicated in field 505.

Figure 6:
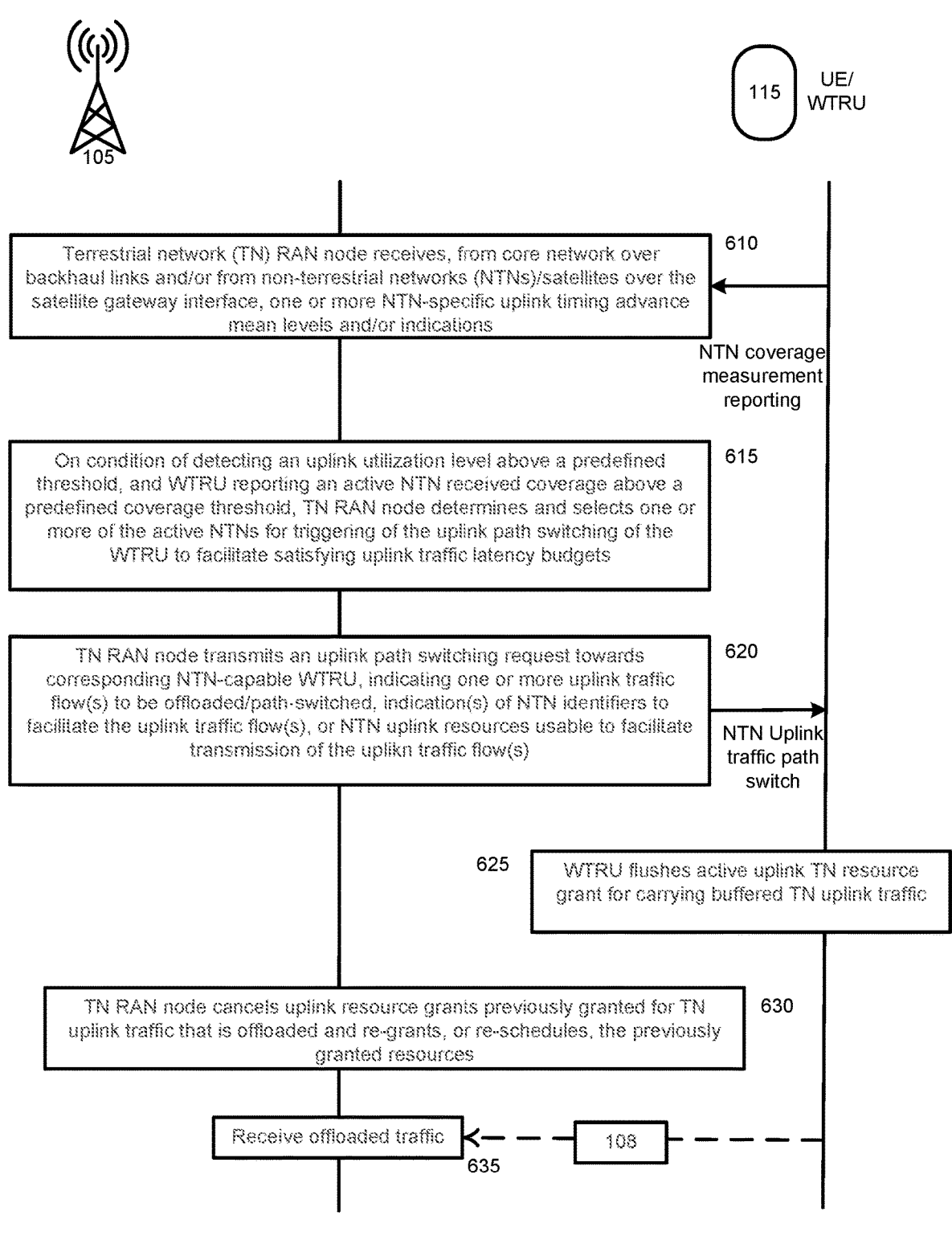
FIG. 6 illustrates a timing diagram of an example embodiment.

Turning now to FIG. 6, the figure illustrates a timing diagram of an example embodiment method 600. At act 610, terrestrial network RAN node 105 may receive, from a core network entity via backhaul links or from a non-terrestrial network/satellite node via a satellite gateway interface, one or more NTN-node-specific uplink timing advance mean/average levels/values, or indications corresponding thereto, that may have been detected/measured, or determined, based on measurements with respect to multiple NTN-capable user equipment devices (which may include UE/WTRU 115) attempting to access one or more NTN nodes, during a timing advance measurement period. At act 615, on condition of detecting an uplink utilization level that fails to satisfy a configured criterion, for example an uplink utilization of resources between RAN node 105 and UE/WTRU 115 that exceeds a configured utilization threshold, and on condition of UE/WTRU 115 having reported a detected/measured signal strength corresponding to an NTN node that satisfies a configured criterion (e.g., a measured signal strength corresponding to a discovery signal broadcast by the NTN node), TN-RAN node 105 may determine and select one or more of active/available NTN nodes facilitating delivery of traffic corresponding to UE 115, delivery of which traffic is currently being facilitated directly by RAN node 105. RAN node 105 may determine to initiate uplink path switching (e.g., offloading) of traffic corresponding to UE/WTRU 115 based on a QoS value corresponding to one or more non-terrestrial uplink resource(s) corresponding to satisfaction of a QoS requirement corresponding to the traffic to potentially be offloaded.

At act 620, TN-RAN node 105 may transmit a path switch information message, or an uplink path switching request, comprising uplink path switching request information, towards NTN-capable UE/WTRU 115. The request/information transmitted at act 620 may comprise one or more identifiers corresponding to one or more uplink traffic flows to be offloaded/path-switched to delivery via an NTN node identified in the uplink path switching request information. The request/information transmitted at act 620 may comprise uplink NTN granted resource information or transmission configuration corresponding to an NTN node identified for offloading in the uplink path switching request information. At act 625, TN-RAN node 105 may cancel facilitating of transmission via resources previously granted/configured for delivery of uplink traffic being offloaded, and may re-grant or re-schedule those resources (e.g., RAN nod 105 may consider the previously-granted uplink resources between the RAN node and UE 115 as now idle) for other uplink traffic, which may correspond to a user equipment other than UE 115. At act 635, radio access network node 105 may receive offloaded uplink traffic, transmitted by user equipment 115 via an NTN node 108 identified in path switch information message transmitted at act 620. NTN node 108 may comprise a satellite and RAN node 105 may receive the offloaded traffic directly from a satellite. Node 108 may comprise a satellite and an NTN gateway, and the RAN node may receive the offloaded traffic from the NTN gateway that may relay the traffic from the satellite node to the radio access network node.

Turning now to FIG. 7, the figure illustrates a flow diagram of an example embodiment 700. Method 700 begins at act 705. At act 710, one or more zone timing advance values corresponding to one or more non terrestrial network nodes may be determined. The zone timing advance values may be determined based on multiple user equipment transmitting one or more preambles during a timing advance measurement period. Timing advance values may be determined by preambles received from user equipment located within one or more geographic zones. One or more geographic zones may correspond to a non-terrestrial network node.

At act 715, a terrestrial network node may request zone timing advance values corresponding to one or more non-terrestrial network modes. A request for zone timing advance values may comprise one or more identifiers corresponding to one or more non-terrestrial network nodes for which zone timing advance values are being requested. At act 720, the terrestrial network node may receive from a core network entity, or from a non-terrestrial network node, one or more zone timing advance values, corresponding to one or more non terrestrial network nodes, requested at act 715.

At act 725, the terrestrial network node may facilitate, or may be facilitating, delivery of traffic flows with respect to a user equipment. The traffic flows may be uplink traffic flows or downlink traffic flows, and each traffic flow may correspond to a quality-of-service criterion that may differ from a quality-of-service criterion corresponding to another traffic flow.

At act 730, the terrestrial network node may determine whether to offload traffic associated with one or more of the traffic flows being facilitated by the terrestrial network node. The determination whether to offload the traffic may be made based on congestion of link resources used to facilitate delivery of the traffic between the user equipment and the terrestrial network node. The determination whether to offload the traffic may be based on a coverage level (e.g., a signal strength), corresponding to the terrestrial network node or corresponding to one or more of the non-terrestrial network nodes for which timing advance values were requested at act 715, as reported by the user equipment. The determination whether to offload the traffic may be based on a quality-of-service value corresponding to the non-terrestrial node with respect to the user equipment and based on whether the quality-of-service value corresponds to satisfaction of a quality of service requirement associated with traffic that may potentially be offloaded for delivery by a non-terrestrial network node. If a determination is made at act 730 that offloading of traffic is not to occur, method 700 advances to act 755 and ends.

Returning to description of act 730, if a determination is made by the terrestrial network node to offload traffic corresponding to one or more traffic flows that are being facilitated by the terrestrial network node with respect to the user equipment, method 700 advances to act 735. At act 735, the terrestrial network node may transmit, and the user equipment may receive, a path switch request message to the user equipment. The path switch request message may comprise a timing advance value corresponding to a non-terrestrial network node zone in which the user equipment is located. The path switch request may comprise resources corresponding to the non-terrestrial network node to be used by the user equipment for delivery of traffic with respect to the terrestrial network node via the non-terrestrial network node. Resources indicated in the path switch request message may comprise timing or frequency resources or transmission configuration information such as coding or modulation scheme information. The path switch request message may comprise one or more identifiers associated with one or more traffic flows for which traffic is to be offloaded for delivery via a non-terrestrial network node, which non-terrestrial network node may be identified in the path switch request message.

At act 740, the user equipment may flush configuration information corresponding to resources being used, or previously used, to deliver traffic corresponding to one or more of the traffic flows, the delivery of which is being facilitated by, or has been facilitated by, the terrestrial network node. At act 745, the terrestrial network node may cancel grant of resources, which may correspond to the resources flushed by the user equipment at act 740, which may release resources corresponding to the grant cancellation for use for delivery of other traffic flows, which may correspond to user equipment other than the user equipment identified in the path switch request message transmitted at act 735. At act 750, the user equipment may transmit offloaded uplink traffic, which may remain directed to the terrestrial node, via a non-terrestrial network node identified in the path switch request message. The offload uplink traffic may be transmitted by the user equipment according to resources and timing advance value information contained in the switch path request message. Accordingly, a terrestrial network node may still receive the uplink traffic transmitted by the user equipment, but more plentiful uplink resources corresponding to the non-terrestrial network node may be used to facilitate delivery of the uplink traffic thus freeing up uplink radio resources corresponding to the terrestrial network node for use in delivering uplink traffic other than the offloaded uplink traffic. Moreover, because zone timing advance values corresponding to the non-terrestrial network node determined at act 710, or that were determined before the terrestrial network node determined to offload traffic at act 730, are used for offloading of traffic, round trip delay in delivery of offloaded traffic corresponding to a distance between the user equipment and the non-terrestrial network node is avoided, which round trip delay would otherwise be imposed if a timing advance corresponding to the user equipment were determined by the non-terrestrial network node after the determination to offload traffic was made at act 730.

Turning now to FIG. 13, the figure illustrates an environment 1300 with multiple non-terrestrial geographic coverage zones 1305-1, 1305-2, and 1305-3 corresponding to a satellite/NTN-node 107. TN-RAN nodes 105 may correspond to one of zones 1305. As shown in FIG. 13, coverage regions corresponding to RAN nodes 105A-105n may form a collective coverage region 1310, or terrestrial coverage region, that corresponds to, or overlaps, zone 1305-2. Each of zones 1305 may correspond to a unit of time measurement that may be used for scheduling resources for communication between TN-RAN node 105 and UE 115 or between NTN-node 107 and the UE. For example, if a time unit of measure for scheduling resources is 0.1 millisecond, a zone 1305 may correspond to a geographic region within which a timing advance value associated with user equipment located anywhere in the geographic region/zone does not deviate by more than 0.1 millisecond. (Geographic size of a zone 1305 may be determined based on the time unit of measure reduced by a configurable tolerance amount.) Accordingly, timing advance 1315-2 associated with zone 1305-2 may be applicable to, and usable by, UEs 115A, 115B, and 115C, but not by UE 115D, and timing advance 1315-3 associated with zone 1305-3 may be applicable to, and usable by, UE 115D but not applicable to, or usable by, UEs 115A, 115B, and 115C.

A zone perimeter may define a non-terrestrial geographic zone 1305. For example, as shown in FIG. 13, zone perimeter 1320-2 may define zone 1305-2. Zone perimeter 1320-2 may comprise a first location 1325-2A and a second location 1325-2B. First location 1325-2A and second location 1325-2B may be separated by a maximum separation distance 1330 corresponding to zone perimeter 1320-2. A first timing advance 1315-2A corresponding to first location 1325-2A and a second timing advance 1315-2B corresponding to second location 1325-2A may not deviate by more than a minimum scheduling time unit, such as, for example, 0.1 ms. Thus, perimeter 1320-2 may have a maximum separation distance 1330 between two locations on perimeter 1320-2 determined based on a scheduling unit, such as a slot, a minislot, a frame, or a subframe. The scheduling unit may be a minimum scheduling unit, or a smallest time unit, used to schedule resources, such that timing advance 1315-2A or timing advance 1315-2B does not deviate from zone timing advance value 1315-2, or from one other, by more than the minimum scheduling unit of time.

Turning now to FIG. 8, the figure illustrates an example embodiment method 800 comprising at block 805 facilitating, by a radio network node comprising at least one processor, receiving, from a network entity, a zone timing advance indication indicative of a zone timing advance value associated with a non-terrestrial geographic zone corresponding to a non-terrestrial network node; at block 810 facilitating, by the radio network node, terrestrial delivery of at least one traffic flow associated with a user equipment according to at least one terrestrial resource corresponding to the radio network node; at block 815 facilitating, by the radio network node, determining to offload delivery of the at least one traffic flow to be delivered according to at least one non-terrestrial resource corresponding to the non-terrestrial network node; and at block 820 facilitating, by the radio network node, transmitting, to the user equipment, at least one path switch information element comprising the zone timing advance indication usable by the user equipment to facilitate the non-terrestrial delivery of the at least one traffic flow according to the at least one non-terrestrial resource via the non-terrestrial network node.

Turning now to FIG. 9, the figure illustrates an example radio access network node 900, comprising at block 905 a processor configured to process executable instructions that, when executed by the processor, facilitate performance of operations, comprising transmitting, to at least one network entity, a zone timing advance information request; at block 910 responsive to transmitting the zone timing advance information request, receiving, from at least one of the at least one network entity, zone timing advance information comprising at least one zone timing advance indication indicative of a zone timing advance value associated with a non-terrestrial geographic zone corresponding to a non-terrestrial network node; at block 915 terrestrially delivering at least one traffic flow associated with a user equipment according to at least one terrestrial resource scheduled by the radio access network node; at block 920 determining to offload delivery of the at least one traffic flow to be delivered according to at least one non-terrestrial resource corresponding to the non-terrestrial network node; and at block 925 transmitting, to the user equipment, a path switch information message comprising the zone timing advance value usable by the user equipment to facilitate the non-terrestrial delivery of the at least one traffic flow according to the at least one non-terrestrial resource via the non-terrestrial network node.

Turning now to FIG. 10, the figure illustrates a non-transitory machine-readable medium 1000 comprising at block 1005 executable instructions that, when executed by a processor of a radio network node, facilitate performance of operations, comprising transmitting, to a network entity, a zone timing advance information request; at block 1010 responsive to transmitting the zone timing advance information request, receiving, from the network entity, zone timing advance information comprising at least one zone timing advance value associated with a satellite coverage zone corresponding to a satellite node; at block 1015 receiving uplink traffic, directed to the radio network node and corresponding to a traffic flow associated with a user equipment, according to at least one terrestrial resource scheduled by the radio network node; at block 1020 determining to request that the user equipment transmit the uplink traffic, according to at least one non-terrestrial uplink resource, via the satellite node; and at block 1025 transmitting, to the user equipment, a path switch information message comprising the zone timing advance value usable by the user equipment to facilitate non-terrestrial transmission of the uplink traffic according to the at least one non-terrestrial resource via the satellite node.

Figure 11:
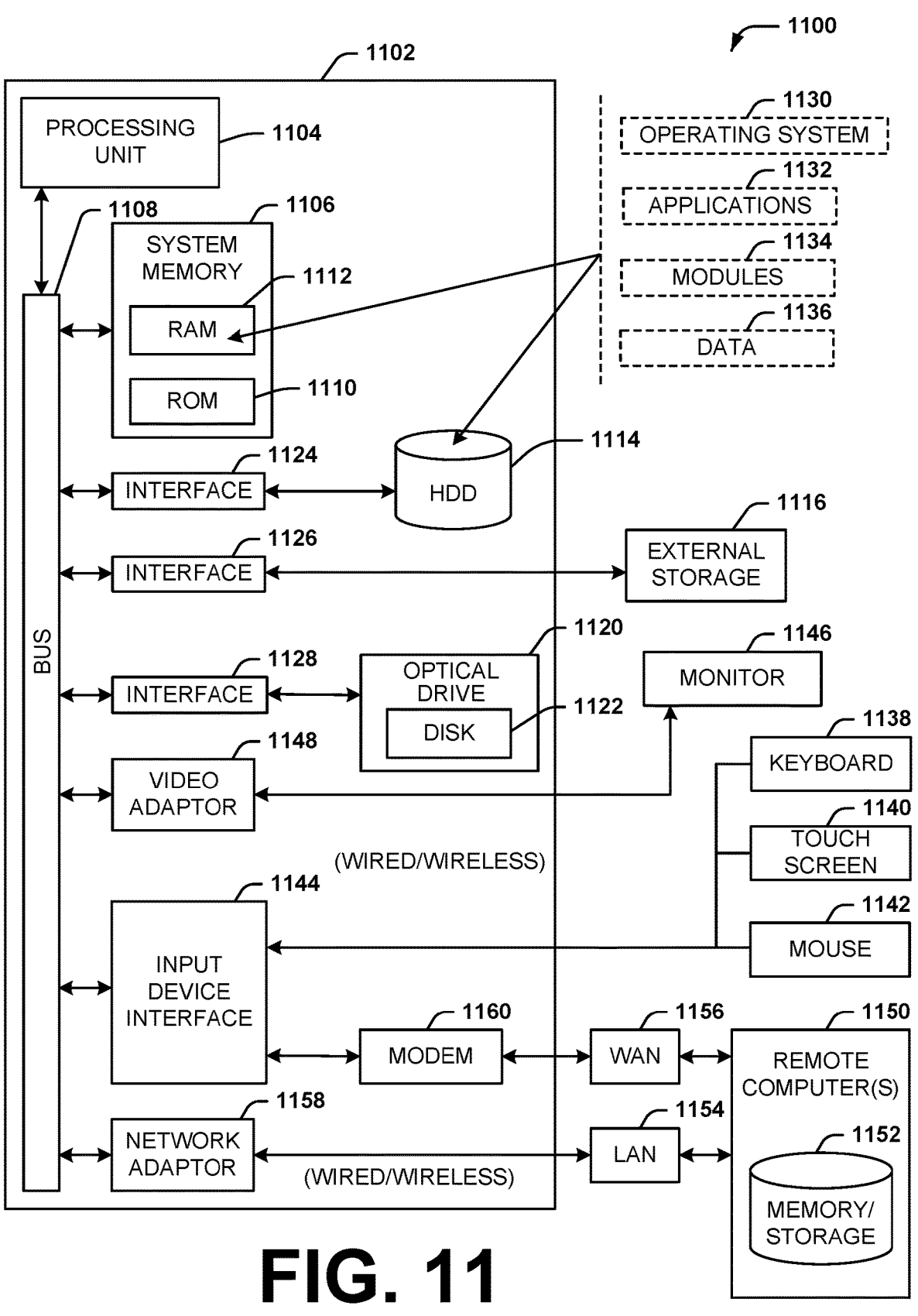
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from disk 1122, for example a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1111 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1111 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
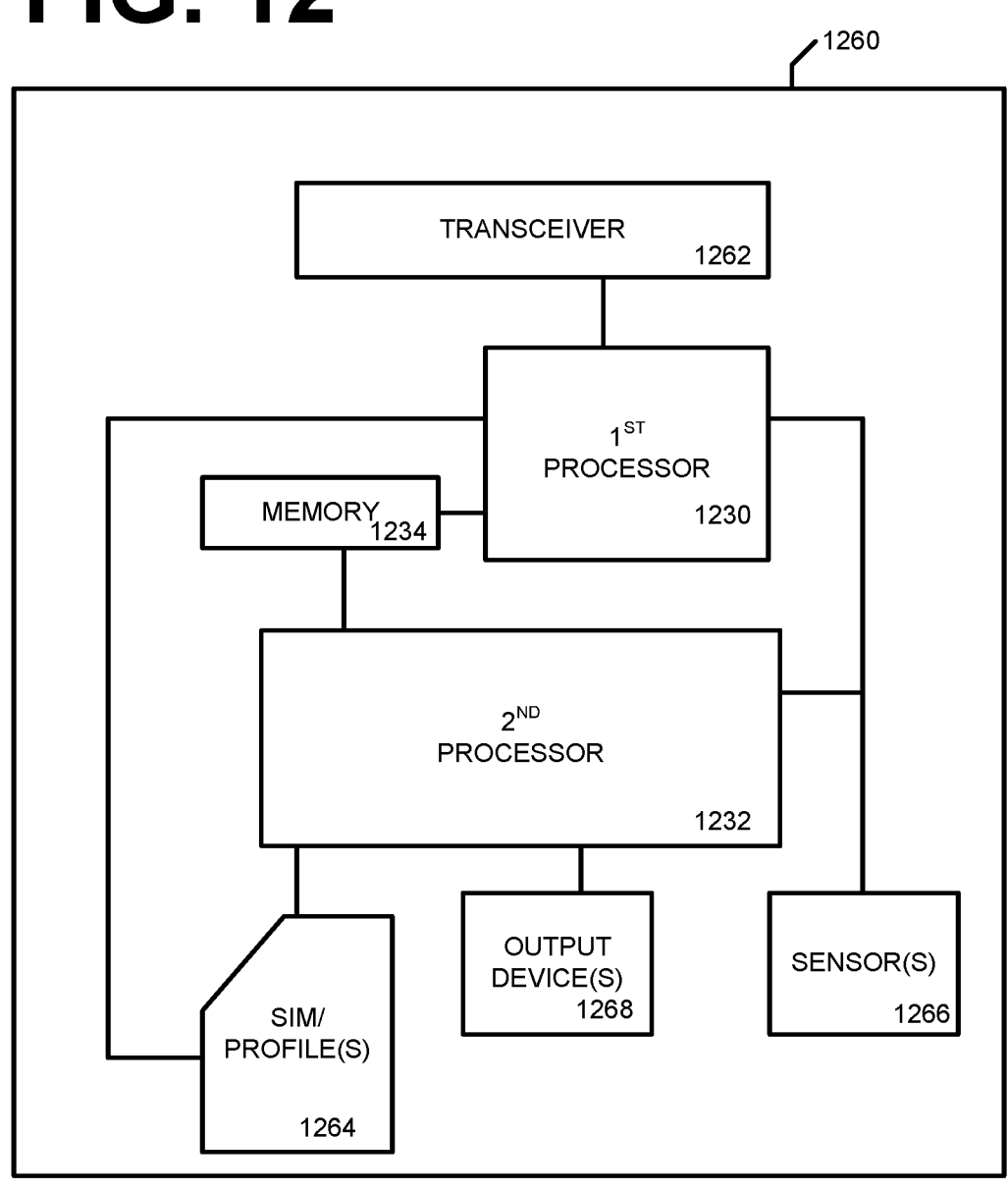
FIG. 12 illustrates a block diagram of an example wireless user equipment.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, an intermediate XR processing unit, and the like. UE 1260 may comprise a first processor 1230, a second processor 1232, and a shared memory 1234. UE 1260 may include radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links 125, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both first processor portion 1230 and second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor second 1232, which may be a more sophisticated application processor than the first processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need the second processor for executing applications and processing data related to an application provides an advantage of reducing power consumption when the UE only needs to use the first processor portion 1230 while in listening mode for monitoring routine configured bearer management and mobility management/ maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, light sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio network node comprising at least one processor, receiving, from a network entity, a zone timing advance indication indicative of a zone timing advance value associated with a non-terrestrial geographic zone corresponding to a non-terrestrial network node;

facilitating, by the radio network node, terrestrial delivery of at least one traffic flow associated with a user equipment according to at least one terrestrial resource corresponding to the radio network node;

facilitating, by the radio network node, determining to offload delivery of the at least one traffic flow to be delivered according to at least one non-terrestrial resource corresponding to the non-terrestrial network node; and facilitating, by the radio network node, transmitting, to the user equipment, at least one path switch information element comprising the zone timing advance indication usable by the user equipment to facilitate the non-terrestrial delivery of the at least one traffic flow according to the at least one non-terrestrial resource via the non-terrestrial network node, wherein a zone perimeter defines the non-terrestrial geographic zone, wherein the zone perimeter comprises a first location and a second location, wherein the first location and the second location are separated by a maximum separation distance corresponding to the zone perimeter, and wherein a first timing advance corresponding to the first location and a second timing advance corresponding to the second location do not deviate by more than a minimum scheduling time unit.

2. The method of claim 1, wherein the at least one traffic flow corresponds to at least one QoS criterion, the method further comprising:

determining, by the radio network node, that the at least one non-terrestrial resource corresponds to satisfaction of the at least one QoS criterion, wherein the determining to offload the delivery of the at least one traffic flow is based on the at least one non-terrestrial resource being determined to correspond to the satisfaction of the at least one QoS criterion.

3. The method of claim 1, wherein a terrestrial coverage region corresponding to the radio network node overlaps, geographically, with the non-terrestrial geographic zone.

4. The method of claim 1, wherein the at least one path switch information element further comprises at least one non-terrestrial resource indication indicative of the at least one non-terrestrial resource.

5. The method of claim 1, wherein the at least one path switch information element further comprises a non-terrestrial network node identifier corresponding to the non-terrestrial network node.

6. The method of claim 1, wherein the network entity is part of a core network.

7. The method of claim 1, wherein the network entity comprises the non-terrestrial network node.

8. The method of claim 1, wherein the non-terrestrial network node comprises a satellite.

9. The method of claim 1, further comprising: obtaining, by the radio network node, the zone timing advance value, the zone timing advance value having been determined to exclude transporting a signal between the user equipment and the non-terrestrial network node.

10. The method of claim 1, wherein the user equipment is a first user equipment, the method further comprising: obtaining, by the radio network node, the zone timing advance value, the zone timing advance value having been determined based on at least one measured value corresponding to a second user equipment.

11. The method of claim 1, wherein the user equipment is a first user equipment, the method further comprising: obtaining, by the radio network node, the zone timing advance value, the zone timing advance value having been determined based on application of a defined function to measured timing advance values that correspond to user equipment other than the first user equipment.

12. A radio access network node, comprising:

a processor configured to process executable instructions that, when executed by the processor, facilitate performance of operations, comprising:

transmitting, to at least one network entity, a zone timing advance information request;

responsive to transmitting the zone timing advance information request, receiving, from at least one of the at least one network entity, zone timing advance information comprising at least one zone timing advance indication indicative of a zone timing advance value associated with a non-terrestrial geographic zone corresponding to a non-terrestrial network node;

terrestrially delivering at least one traffic flow associated with a user equipment according to at least one terrestrial resource scheduled by the radio access network node;

determining to offload delivery of the at least one traffic flow to be delivered according to at least one non-terrestrial resource corresponding to the non-terrestrial network node;

transmitting, to the user equipment, a path switch information message comprising the zone timing advance value usable by the user equipment to facilitate the non-terrestrial delivery of the at least one traffic flow according to the at least one non-terrestrial resource via the non-terrestrial network node; and scheduling the at least one non-terrestrial resource, wherein the path switch information message comprises at least one non-terrestrial uplink resource indication indicative of the at least one non-terrestrial uplink resource usable by the user equipment transmit the uplink traffic, directed to the radio network node, via the satellite node, and wherein the path switch information message comprises a satellite node identifier indicative of the satellite node.

13. The radio access network node of claim 12, wherein the zone timing advance information request comprises a zone identifier corresponding to the non-terrestrial geographic zone.

14. The radio access network node of claim 13, wherein the at least one network entity determines the zone timing advance value corresponding to the non-terrestrial geographic zone associated with the zone identifier.

15. The radio access network node of claim 12, wherein the at least one non-terrestrial resource is usable to transmit, to the non-terrestrial network node, uplink traffic corresponding to the at least one traffic flow.

16. The radio access node of claim 12, wherein the operations further comprise:

determining that the at least one non-terrestrial resource corresponds to satisfaction of at least one QoS criterion associated with the at least one traffic flow, wherein the determining to offload the delivery of the at least one traffic flow is based on the at least one non-terrestrial resource being determined to correspond to the satisfaction of the at least one QoS criterion.

17. A non-transitory machine-readable medium, comprising executable instructions that, when executed by a processor of a radio network node, facilitate performance of operations, comprising:

transmitting, to a network entity, a zone timing advance information request;

responsive to transmitting the zone timing advance information request, receiving, from the network entity, zone timing advance information comprising at least one zone timing advance value associated with a satellite coverage zone corresponding to a satellite node;

receiving uplink traffic, directed to the radio network node and corresponding to a traffic flow associated with a user equipment, according to at least one terrestrial resource scheduled by the radio network node;

determining to request that the user equipment transmit the uplink traffic, according to at least one non-terrestrial uplink resource, via the satellite node;

transmitting, to the user equipment, a path switch information message comprising the zone timing advance value usable by the user equipment to facilitate non-terrestrial transmission of the uplink traffic according to the at least one non-terrestrial resource via the satellite node; and scheduling the at least one non-terrestrial resource, wherein the path switch information message comprises at least one non-terrestrial uplink resource indication indicative of the at least one non-terrestrial uplink resource usable by the user equipment to transmit the uplink traffic, directed to the radio network node, via the satellite node, and wherein the path switch information message comprises a satellite node identifier indicative of the satellite node.

18. The non-transitory machine-readable medium of claim 17, wherein the satellite node excludes a non-terrestrial node gateway.

19. The non-transitory machine-readable medium of claim 17, wherein the uplink traffic corresponds to at least one QoS criterion; the operations further comprising:

determining that a congestion value corresponds to the at least one terrestrial resource violating a congestion criterion to result in a determined congestion value; and responsive to the determined congestion value being determined to correspond to the violating of the congestion criterion, determining that the at least one non-terrestrial resource corresponds to satisfaction of the at least one QoS criterion, wherein the radio network node determines to request that the user equipment transmit the uplink traffic, according to at least one non-terrestrial uplink resource, via the satellite node, based on the at least one non-terrestrial resource being determined to correspond to the satisfaction of the at least one QoS criterion.

20. The non-transitory machine-readable medium of claim 17, wherein the operations further comprise determining that the at least one non-terrestrial resource corresponds to satisfaction of at least one QoS criterion associated with the at least one traffic flow, wherein the determining to request that the user equipment transmit the uplink traffic, according to at least one non-terrestrial uplink resource, via the satellite node is based on the at least one non-terrestrial resource being determined to correspond to the satisfaction of the at least one QoS criterion.

* * * * *